(12) United States Patent
Giammattei

(10) Patent No.: US 7,097,443 B2
(45) Date of Patent: *Aug. 29, 2006

(54) EXTRUDER TRANSITION SECTION

(75) Inventor: Mark Howard Giammattei, Selkirk, NY (US)

(73) Assignee: General Electric Company, Niskayuna, NY (US)

( * ) Notice: Subject to any disclaimer, the term of this patent is extended or adjusted under 35 U.S.C. 154(b) by 670 days.

This patent is subject to a terminal disclaimer.

(21) Appl. No.: 10/084,802

(22) Filed: Feb. 28, 2002

(65) Prior Publication Data

US 2002/0123556 A1  Sep. 5, 2002

Related U.S. Application Data

(62) Division of application No. 09/705,266, filed on Nov. 3, 2000, now Pat. No. 6,511,217.

(51) Int. Cl.
*B28B 17/02* (2006.01)

(52) U.S. Cl. .................. 425/208; 425/183; 425/379.1; 425/382.3; 425/190; 366/91

(58) Field of Classification Search ................ 425/208, 425/183, 379.1, 382.3, 190; 366/91
See application file for complete search history.

(56) References Cited

U.S. PATENT DOCUMENTS

| | | | | | |
|---|---|---|---|---|---|
| 3,224,739 | A | * | 12/1965 | Gerrit ........................... | 366/78 |
| 3,256,562 | A | * | 6/1966 | Heard, Jr. .................... | 425/132 |
| 3,577,588 | A | * | 5/1971 | Chrisholm ................ | 425/131.1 |
| 3,632,256 | A | * | 1/1972 | Kasting et al. ............. | 425/205 |
| 3,782,870 | A | * | 1/1974 | Schippers ................... | 425/4 C |
| 3,824,208 | A | | 7/1974 | Link et al. | |
| 4,103,354 | A | * | 7/1978 | Gorbatov et al. ............. | 366/88 |
| 4,118,163 | A | * | 10/1978 | Lee ............................. | 425/146 |
| 4,443,109 | A | * | 4/1984 | Watts ......................... | 366/134 |
| 4,528,324 | A | | 7/1985 | Change et al. | |
| 4,689,187 | A | * | 8/1987 | Markel et al. ............. | 264/40.5 |
| 4,737,561 | A | | 4/1988 | Stary et al. | |
| 4,898,898 | A | | 2/1990 | Fitzgerald et al. | |
| 4,959,186 | A | * | 9/1990 | Dollhopf et al. ............ | 264/102 |
| 5,018,673 | A | | 5/1991 | Ench et al. | |
| 5,153,238 | A | | 10/1992 | Bilgrien et al. | |

(Continued)

FOREIGN PATENT DOCUMENTS

EP    0 570 387 B1    1/1992

(Continued)

*Primary Examiner*—Robert Davis
*Assistant Examiner*—G. Nagesh Rao
(74) *Attorney, Agent, or Firm*—Shawn A. McClintic; William E. Powell, III

(57) ABSTRACT

A method and system are provided that efficiently compound high levels of inorganic filler, processing fluid and silicone polymer at a commercial rate into homogeneous filled and devolatilized silicone compositions. In the method, filled silicone compositions are compounded by compounding a filler, processing fluid and silicone polymer in a first compounding apparatus to produce a first dispersed composition and simultaneously compounding a filler, processing fluid and silicone polymer in a second compounding apparatus that shares a common extruder shaft with the first compounding apparatus to produce a second dispersed composition. The system comprises a first compounding apparatus and a sequential second compounding apparatus that shares a common shaft with the first compounding apparatus. An extruder transition section of the system includes an enclosed discharge chamber defined by a first sectioning wall, a second sectioning wall and a contoured lower wall that transitions toward a discharge port and a shaft extends through the first sectioning wall, traverses the chamber and extends through the second sectioning wall.

13 Claims, 2 Drawing Sheets

U.S. PATENT DOCUMENTS

| | | |
|---|---|---|
| 5,198,171 A | 3/1993 | Kasahara et al. |
| 5,259,671 A * | 11/1993 | Lowe et al. ............... 366/83 |
| 5,338,112 A | 8/1994 | Boden et al. |
| 5,409,978 A | 4/1995 | Hamada et al. |
| 5,518,672 A * | 5/1996 | Luker ..................... 264/40.1 |
| 5,531,923 A | 7/1996 | LeBlanc et al. |
| 5,573,189 A | 11/1996 | Ward et al. |
| 5,623,028 A | 4/1997 | Fitzgerald et al. |
| 5,674,935 A | 10/1997 | Evans et al. |
| 5,679,726 A | 10/1997 | Gutek et al. |
| 5,910,276 A | 6/1999 | Guntherberg et al. |
| 5,925,709 A | 7/1999 | Rauwendaal |
| 6,179,459 B1 * | 1/2001 | Kobayashi et al. ......... 366/77 |
| 6,572,253 B1 * | 6/2003 | Silvi et al. ................ 366/91 |

FOREIGN PATENT DOCUMENTS

| | | |
|---|---|---|
| EP | 0 902 057 A2 | 3/1999 |

* cited by examiner

EXTRUDER TRANSITION SECTION

This application is a division of application Ser. No. 09/705,266, filed Nov. 03, 2000 and now U.S. Pat. No. 6,511,217.

BACKGROUND OF THE INVENTION

The invention relates to a sequential method and system to compound heat-vulcanizable silicone compositions.

A heat-vulcanizable silicone composition comprises a high viscosity silicone polymer, an inorganic reinforcing filler and various additives that aid processing or impart desired final properties to the composition. A vulcanizing agent can be added and the composition heat-cured to fabricate silicone rubber moldings such as gaskets, medical tubing and computer keypads.

Typically, the heat-vulcanizable silicone composition is produced by kneading a high-viscosity polydiorganosiloxane, the inorganic filler and additives by means of a batch kneading machine such as a high intensity Banbury mixer or a low intensity double arm dough mixer. In this process, polydiorganosiloxane, inorganic filler and treating agents are batch mixed until desired properties are obtained. This process requires long residence times and large amounts of energy. Non-homogeneous shear and extensional stresses across a commercial sized batch can result in non-uniform size distribution of filler that results in variations in properties. Batches processed at different times may be characterized by different physical properties. The batch process is labor, energy and capital intensive and produces materials of only marginal consistency.

In Kasahara et al., U.S. Pat. No. 5,198,171, a premix is formed in a first step wherein a polydiorganosiloxane having a viscosity at 25° C. of $1 \times 10^5$ cP or more, an inorganic filler and a treating agent are mixed in a high-speed mechanical shearing machine. The step produces a flowable particulate mixture in which each ingredient is present in a substantially uniform, finely dispersed state. The premix is then fed at a constant feed rate into an extruder that has two screws rotating in the same direction and has a length to diameter ratio (L/D) of 25 to 50.

In Hamada et al., U.S. Pat. No. 5,409,978, a premix of polydiorganosiloxane, inorganic filler and treating agents is formed at a temperature in the range of about 200° C. to 300° C. in a co-rotating continuous double screw extruder with L/D of about 25 to 50. The premix is then compounded and heat treated at 150° C. to 300° C. in a counter-rotating, double screw extruder. A useful L/D ratio for the second extruder is in the range of about 5 to 15.

Highly vigorous first step processes for forming a premix of silicone polymer, filler and treating agent generate a product having a high volatiles content. The premix must be mixed with additional polymer and devolatilized in a second step to produce a useful product. Other newer processes that avoid a premix and/or that use a raw untreated filler can be limited in throughput. Larger diameter extruders will increase throughput. However, larger diameter extruders must be custom built. Hence, larger extruders are expensive and cost more per unit capacity. There is a need for a process that continuously and consistently produces a devolatilized high viscosity filled silicone polymer composition at high throughput. Further, there is a need for an improved continuous compounding method that efficiently utilizes compounding equipment while providing commercial scale production.

BRIEF SUMMARY OF THE INVENTION

The invention provides a method and system that efficiently compounds high levels of inorganic filler, processing fluid and silicone polymer at a commercial rate into homogeneous filled and devolatilized silicone compositions. In the method, filled silicone compositions are compounded by compounding a filler, processing fluid and silicone polymer in a first compounding apparatus to produce a first dispersed composition. Simultaneously, filler, processing fluid and silicone polymer are compounded in a second compounding apparatus that shares a common extruder shaft with the first compounding apparatus to produce a second dispersed composition.

The system comprises a first compounding apparatus and a second compounding apparatus that shares a common shaft with the first compounding apparatus.

In another embodiment, the invention relates to an extruder transition section. The section comprises an enclosed discharge chamber defined by a first sectioning wall, a second sectioning wall and a contoured lower wall that transitions toward a discharge port. A shaft extends through the first sectioning wall, traverses the chamber and extends through the second sectioning wall.

DETAILED DESCRIPTION OF THE INVENTION

Figure 1:
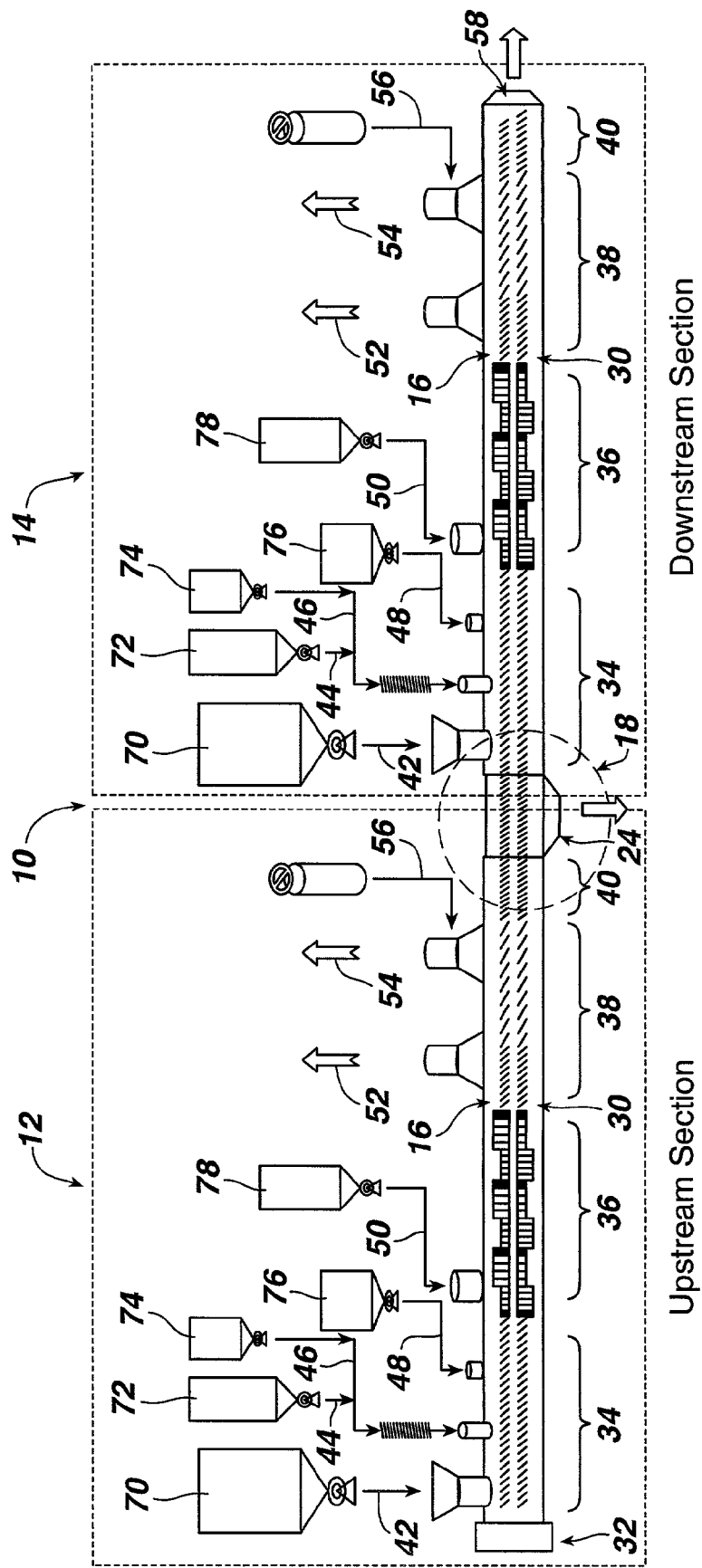
FIG. 1 is a schematic representation of a silicone composition compounding process and system.

A process and system are provided by the invention to compound high levels of components such as treated or untreated fumed silica and processing fluid into a silicone polymer, such as high molecular weight poly(dimethylsiloxane). The process and system produce homogeneous mixtures having required reinforcing properties and levels of residual volatiles at satisfactory commercial throughputs. The process includes at least two sequential compounding steps, wherein filler and silicone polymer are mixed and compounded.

The processing fluid is a fluid that can be admixed with a filler and compounded to densify the filler for further processing. The processing fluid can also provide a processing function. For example, it can be a liquid treating agent, plasticizer, flow improving additive, cross-linking agent, water or inert blanketing gas. Silicone polymers of a molecular weight greater than 7000 are not processing fluids. Preferably, the processing fluid is a liquid treating agent such as a silanol-reacting treating agent that can be added before, with or after addition of filler to wet the filler to reduce overall processing time for reaction between functional groups in the treating agent and silanols on the surface of the filler.

In one embodiment, the processing fluid is a solution prepared by mixing (in weight) 1.21 parts of a silanol-stopped polydimethylsiloxane, 1.82 parts of a vinyl-stopped dimethyl-methylvinylsiloxane and 0.12 part of a hydroxy-terminated polydimethyl-methylvinylsiloxane. A broad range of parts of silanol-stopped polydimethylsiloxane/vinyl-stopped dimethyl-methylvinylsiloxane/hydroxy-terminated polydimethyl-methylvinylsiloxane can be 0.49/0.73/

0.05 to 1.93/2.91/0.19, a desired range is 0.85/1.27/0.08 to 1.57/2.37/0.16 and a preferred range is 1.09/1.64/0.11 to 1.32/2.0/0.13

In another embodiment, the processing fluid can be a combination of treating agent, preferably hexamethyldisilazane (HMDZ) and water. This combination can comprise a weight ratio of treating agent/water of between about 0.05 to about 50, preferably between about 0.1 and about 20, and more preferably between about 1 and about 6. The HMDZ can be added either together with water or separately at the same or different locations of an extruder.

The processing fluid can be combined with filler in a weight proportion of about 0.1 to about 100 parts fluid to 100 parts of filler, desirably about 0.5 to about 75 parts fluid to 100 parts of filler and preferably about 1.0 to about 50 parts fluid to 100 parts of filler. The processing fluid can be added at a single location or at a plurality of locations of the compounding apparatus for step treatment of the filler.

The inorganic filler can be any inorganic filler used in blends with silicone polymers. Examples of inorganic fillers include a reinforcing silica such as fumed silica or precipitated silica or a silica that has been surface-treated with an organosilicon compound such as an organopolysiloxane, organoalkoxysilane, organochlorosilane or a hexaorganodisilazane. The filler can be diatomaceous earth, finely crushed quartz, aluminum oxide, titanium oxide, iron oxide, cerium oxide, cerium hydroxide, magnesium oxide, zinc oxide, calcium carbonate, zirconium silicate, carbon black or ultramarine. A single filler or a combination of fillers can be used to reinforce the silicone polymer.

The amount of the filler can be in the range of from about 5 to about 200 parts by weight, desirably from about 10 to about 100 parts by weight and preferably from about 20 to about 60 parts by weight, per 100 parts by weight of silicone polymer.

The concentration of residual silanol groups on the surface of a filler can govern strength of hydrogen bonds between the silica and hydroxyl or oxygen groups in the silicone polymer chain. High concentrations of residual silanols in a filler cause "structuring" or "crepe hardening" of the final product in storage. This effect leads to difficulties in the processing of the material after it has been stored for extended periods. If the concentration of silanol functional groups in a filler is too high, a treating agent can be added to reduce the groups to a required concentration. The silanol reactant treating agent can react to reduce available groups to a concentration of between about 8 to about 2 hydroxyl groups/(nanometer)$^2$ of filler, preferably between about 5 to about 3 hydroxyl groups/(nanometer)$^2$ of filler. Untreated raw silica is a preferred filler in the invention, in an amount from about 10 to about 100 parts by weight, preferably from about 20 to about 60 parts by weight, per 100 parts by weight of silicone polymer.

A treating agent can be mixed into the filler along with the processing fluid or the treating agent can be the processing fluid to reduce filler silanol groups and/or to improve dispensability of the filler to prevent crepe hardening and/or to regulate plasticity. The treating agent can be the silanol-reacting reagent or another filler treating agent. The treating agent is preferably a silanol reactant treating agent when the filler is a silica or other silanol containing filler. The treating agent can be an organosilane, a low-viscosity polysiloxane or a silicone resin, which has a silanol group and/or an alkoxy group having 1 to 6 carbon atoms. Examples include diphenylsilanediol, dimethylsilanediol, methyltriethoxysilane and phenyltrimethoxysilane. The low-viscosity polysiloxane may contain one or more kinds of organic groups selected from a methyl group, a phenyl group, a vinyl group and a 3,3,3-trifluoropropyl group. The viscosity of the low-viscosity polysiloxane measured at 25° C. is in the range of from about 1 to about 300 cP, preferably from about 5 to about 100 cP. Preferred silanol-reactant treating agents include at least one of silanol-stopped polydimethylsiloxane, octamethylcyclotetrasiloxane (D4) and hexamethyldisilazane (HMDZ). While the filler can be treated as described, a particular advantage is that raw untreated filler can be used in the inventive process.

The silicone polymer used in the compositions of the present invention is represented by recurring units of Formula I:

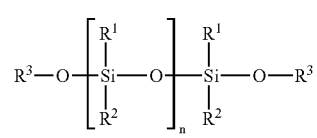

Formula 1 wherein, $R^1$ independently at each occurrence represents $C_{1-4}$ alkyl, or $C_{2-4}$ alkylene; $R^2$ independently at each occurrence represents $C_{1-4}$ alkyl, $C_1-C_4$ haloalkyl or $C_{2-4}$ alkylene; $R^3$ independently at each occurrence represents H, $C_{1-10}$ alkyl, $C_{2-4}$ alkylene, $C_{4-6}$ cycloalkyl, OH or $C_1-C_4$ haloalkyl; and n represents an integer from about 100 to about 20,000.

A further preferred composition comprises a silicone polymer wherein, $R^1$ independently at each occurrence represents, $CH_3$ or $CH=CH_2$; $R^2$ independently at each occurrence represents, $CH_3$, $CH=CH_2$ or $CH_2CH_2CF_3$; $R^3$ independently at each occurrence represents $CH_3$, $CH=CH_2$, OH or $CH_2CH_2CF_3$; and n represents an integer from about 4,000 to about 10,000.

In one embodiment, the vinyl content of the silicone polymer ranges from about 0.05% to about 0.5% by weight of the silicone polymer.

The silicone composition can also include other additives such as heat-resistance improvers such as oxides, hydroxides and fatty acid salts of metals, vulcanization reverse inhibitors, flame retardants such as platinum compounds, discoloration preventive agents, plasticizers such as silicone oil, internal release agents such as metal soaps, pigments and dyes.

During processing, an inert blanketing gas can be added to the compounding environment to suppress oxidative reactions between a flammable processing fluid such as HMDZ, and air. The amount of inert gas can be in the range of from about 20 to about 800 parts by weight, desirably from about 50 to about 600 parts by weight and preferably from about 100 to about 400 parts by weight per 100 parts by weight of the filler.

In an embodiment of the invention, untreated fumed silica filler can be mixed with a processing fluid that comprises HMDZ and water at a first location prior to addition of the silicone polymer. The amount of HMDZ can be in the range of from about 0.1 to about 100 parts by weight, desirably from about 0.5 to about 50 parts by weight and preferably from about 1.0 to about 20 parts by weight, per 100 parts by weight of the fumed silica. The amount of water can be in the range of from about 0.1 to about 100 parts by weight, desirably from about 0.5 to about 20 parts by weight and preferably from about 1 to about 10 parts by weight, per 100 parts by weight of the fumed silica.

The compositions produced by the process of the invention meet physical property standards for heat-vulcanizable silicone compositions. For example, the compositions can be characterized by a Williams Plasticity greater than 100, Shore A hardness greater than 20, tensile strength greater than 750 psi, elongation at break at least 100%, Tear B at least 10 ppi, Specific Gravity at least 1.05 and residual volatiles below 1 weight percent.

Features of the invention will become apparent from the following drawings and detailed discussion, which by way of example without limitation describe embodiments of the present invention.

Figure 2:
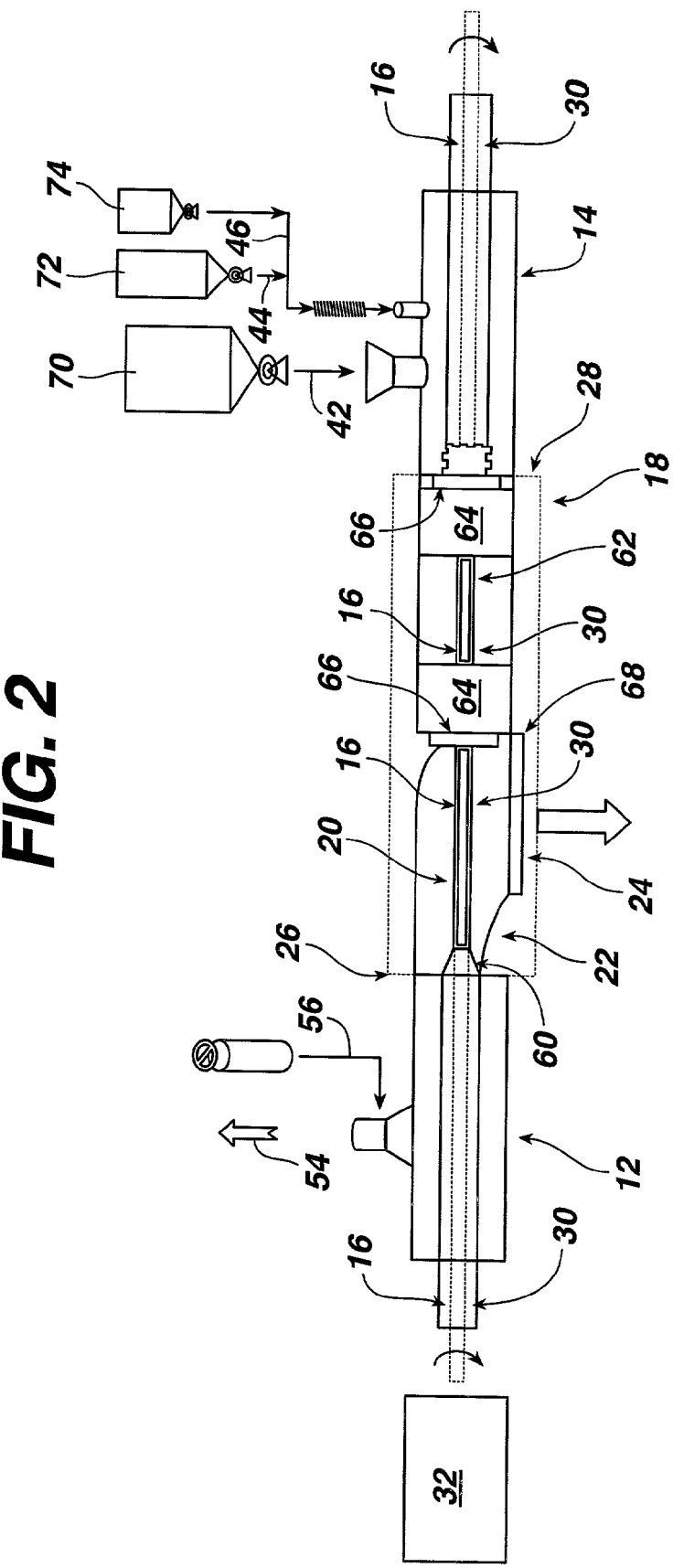
FIG. 2 is a schematic representation of a transition section used with the process and system of FIG. 1.

In the drawings, FIG. 1 is a schematic representation of a silicone composition compounding process and system and FIG. 2 is a schematic representation of a transition section used with the process and system of FIG. 1. In the FIGs., like elements are identified by the same numbers.

In FIG. 1, a system 10 for compounding filled silicone compositions is shown, comprising a first upstream compounding apparatus 12 and a sequential second downstream compounding apparatus 14. Upstream apparatus 12 and downstream apparatus 14 are shown contiguous to one another. The compounding apparatus 12 and 14 share common shaft 16, which drives extruder elements as hereinafter described.

Each compounding apparatus 12 and 14 can be a double screw apparatus of the co-rotating, intermeshing type, a counter-rotating, non-intermeshing type, a single-screw reciprocating or a single screw non-reciprocating type. The co-rotating, intermeshing double screw apparatus is especially suited for the process of this invention due to its capability to provide adequate mixing intensity and surface area renewal for filler dispersal, chemical reaction and devolatilization.

Further referring to FIGS. 1 and 2, the system 10 includes a transition section 18 that includes an enclosed discharge chamber 20 that has a contoured lower wall 22 that transitions toward discharge port 24. Shaft 16 is shown extending from the interior of upstream apparatus 12 through first sectioning wall 26, traversing the transition section 18 and extending through second sectioning wall 28 into the interior of downstream apparatus 14. Similarly, shaft 30 extends through first section wall 26 to traverse the transition section 18 and to extend through second sectioning wall 28 into downstream apparatus 14. The shafts 16 and 30 are in the same horizontal plane but for description purposes are shown above one another in FIG. 1.

According to the invention, and as shown in the FIGS. 1 and 2, the shafts 16 and 30 are common to both upstream apparatus 12 and downstream apparatus 14. The shafts 16 and 30 are shown commonly driven by motor drive 32, however in other embodiments, the shafts 16 and 30 are separately driven. The shafts 16 and 30 are shown having various compounding elements that make up a conveying stage 34, a kneading stage 36 for distributive and dispersive mixing, churning stage 38 for deairation and devolatilization and a discharge conveying stage 40.

Each of the upstream compounding apparatus 12 and the downstream compounding apparatus 14 has feed port 42 for charging raw untreated or treated fumed silica, feed port 44 for charging a silanol treating agent such as HMDZ, feed port 46 for charging deionized water, feed port 48 for charging a processing fluid and feed port 50 for charging a high molecular weight silicone polymer. Each of the upstream compounding apparatus 12 and the downstream compounding apparatus 14 has atmospheric vent 52, vacuum drawoff 54 and line 56 for charging an inert gas to the vacuum drawoff.

Downstream compounding apparatus 14 has discharge end 58 for discharging highly filled elastomeric product. Product from the upstream compounding apparatus is conveyed out of the apparatus 12 and into transition section 18. Particularly referring to FIG. 2, the transition section 18 includes discharge chamber 20 having a lower wall 22 that slopes toward discharge port 24 as described above. Within the transition section 18, shafts 16 and 30 include special screw tip element 60 and spacer elements 62, shaft supporting bearings 64, shaft seal packing 66 and profile strand extrusion die 68. The transition section can be disconnectable to permit the first compounding apparatus 12 to be disconnected from the second compounding apparatus 14.

In the method of FIGS. 1 and 2, filler, treating agent, deionized water, processing fluid, and silicone polymer are continuously supplied from respective storage tanks 70, 72, 74, 76, and 78 into respective apparatus 12 and 14. In the apparatus 12 and 14, the filler, treating agent, water, processing fluid and silicone polymer are continuously compounded and discharged at 24 and 58 as extrudates. The material in both apparatus, 12 and 14, is compounded by elements on common shafts 16 and 30, which are driven by motor 32.

Throughput and screw speed can be adjusted in the apparatus to allow for efficient compounding and devolatilization. Low throughput underutilizes the capacity of manufacturing equipment. On the other hand, throughput is limited by the rate at which fumed silica can be added into an extruder. High screw speeds are needed for addition and dispersion of filler and dispersion of additives into the silicone matrix and for generation of surface area for devolatilization. However, temperature rises due to viscosity and screw speed. The use of severe screw speeds can result in thermal degradation of the silicone polymer. In the invention, scalable throughput with balanced mixing intensity provides effective compounding and reaction of silicone composition components with adequate process devolatilization and heat dissipation. The sequential, contiguous arrangement permits operation at standard screw conditions but with double throughput.

An extruder screw speed for apparatus 12 and 14, can be between about 100 rpm and about 1000 rpm to provide a suitable balancing of mixing with frictional heat generation. Desirably, the screw speed is between about 200 rpm and about 800 rpm and preferably between about 280 rpm and about 450 rpm. A ratio of throughput to screw speed (lb/hour/rpm) can be between about 0.01 to about 100, desirably between 0.1 and about 70 and preferably between about 0.5 and about 50 lb/hour/rpm. Exterior barrel temperature for both apparatus 12 and 14, can be between about 100° C. and about 200° C., desirably between about 130° C. and about 190° C., and preferably between about 160° C. and about 180° C.

These and other features will become apparent from the following examples, which describe preferred embodiments of the present invention.

EXAMPLE

The following Example is conducted in the dual apparatus 10 of FIG. 1. In FIG. 1, the upstream compounding apparatus 12 (designated Apparatus A) and downstream compounding apparatus 14 (Designated Apparatus B) are commonly driven by shafts 16 and 30, which are driven by motor drive 32. Both upstream compounding apparatus 12 and downstream apparatus 14 have co-rotating, intermeshing double screw configurations (L/D=30, screw diameter=30mm). The apparatus 12 and 14 are joined by transition section 18. While the combined length to diameter ratio (L/D ratio) of apparatus 12 and 14 is about 60, in other embodiments, the combined L/D ratio can be greater than about 40 or even greater than about 60.

Fumed silica is simultaneously metered at 42 into apparatus 12 and the downstream apparatus 14 along with treating agent at 44 and deionized water at 46. Processing fluid is added at 48 and silicone polymer is added at 50 into both apparatus. The processing fluid is a combination of a silanol-stopped polydimethylsiloxane, a vinyl-stopped dimethyl-methylvinylsiloxane and a hydroxy-terminated polydimethyl-methylvinylsiloxane. Air entrained in the fumed silica and surplus volatiles are eliminated through vents 52 and 54 in both apparatus 12, 14.

Fumed silica-filled silicone compositions at a throughput of about 9 lb/hr of silicone polymer per apparatus are compounded in with about 0.6 lb/hr HMDZ, 0.1 lb/h water, 1.0 lb/hr processing fluid, 4.7 lb/hr untreated filler per apparatus at barrel temperatures of about 170° C. and torque of 33%. TABLE 1 shows material properties for product from both Apparatus A and Apparatus B with common shaft according to the invention.

TABLE 1

|  | Apparatus A | Apparatus B |
|---|---|---|
| Residual Voatiles (%) | 0.3 | 0.4 |
| Shore A Hardness | 66 | 64 |
| Tensile Strength (psi) | 1440 | 1460 |
| Elongation at Break (%) | 390 | 440 |
| Tear B (ppi) | 135 | 140 |
| 100% Modulus | 370 | 350 |
| Specific Gravity | 1.18 | 1.18 |
| Williams Plasticity (10 minutes) | 330 | 280 |
| Williams Plasticity (3 weeks) | 510 | 390 |
| Transparency | 78 | 78 |
| Haze | 21 | 23 |
| Yellowness Index | 12 | 13 |

The results of TABLE 1 show that the process of the invention can produce materials within physical property standards for filled heat-vulcanizable silicone compositions.

The invention has been described in detail with particular reference to preferred embodiments thereof, but it will be understood that variations and modification can be effected within the scope of the invention.

What is claimed is:

1. An extruder transition section, comprising an enclosed discharge chamber defined by a first section wall, a second sectioning wall and a contoured lower wall that transitions longitudinally toward a discharge port and a shaft that extends through said first sectioning wall, traverses said chamber and extends through said second sectioning wall, where both first and second sectioning walls are engaged with disconnectable couplings that permit said first compounding apparatus to be disconnected from said second compounding apparatus.

2. The extruder transition section of claim 1, wherein said section connects a first compounding apparatus to a second compounding apparatus.

3. The extruder transition section of claim 2, wherein said shaft is common to said first compounding apparatus and to said second compounding apparatus.

4. An extruder transition section, said extruder transition section connecting an upstream compounding apparatus and a downstream compounding apparatus, said extruder transition section comprising an enclosed discharge chamber defined by a first sectioning wall, a second sectioning wall and a contoured lower wall that transitions toward a discharge port and a shaft that extends through said first sectioning wall, traverses said chamber and extends through said second sectioning wall, where said first and second sectioning walls are engaged with disconnectable couplings that permit said upstream compounding apparatus to be disconnected from said downstream compounding apparatus.

5. An extruder transition apparatus according to claim 4 wherein said shaft is common to said upstream compounding apparatus and said downstream compounding apparatus.

6. An extruder transition section according to claim 4 wherein said upstream compounding apparatus and said downstream compounding apparatus have co-rotating, intermeshing double screw configurations.

7. An extruder transition section according to claim 6 wherein said upstream compounding apparatus and said downstream compounding apparatus have length to diameter ratios of 30 or less.

8. An extruder transition section according to claim 4 wherein said upstream compounding apparatus and said downstream compounding apparatus have counter-rotating, non-intermeshing double screw configurations.

9. An extruder transition section according to claim 8 wherein said upstream compounding apparatus and said downstream compounding apparatus have length to diameter ratios of 30 or less.

10. An extruder transition section according to claim 4 wherein said upstream compounding apparatus and said downstream compounding apparatus have reciprocating single screw configurations.

11. An extruder transition section according to claim 10 wherein said upstream compounding apparatus and said downstream compounding apparatus have length to diameter ratios of 30 or less.

12. An extruder transition section according to claim 4 wherein said upstream compounding apparatus and said downstream compounding apparatus have non-reciprocating single screw configurations.

13. An extruder transition section according to claim 12 wherein said upstream compounding apparatus and said downstream compounding apparatus have length to diameter ratios of 30 or less.

* * * * *